(12) United States Patent
Kunimoto et al.

(10) Patent No.: US 7,547,144 B2
(45) Date of Patent: Jun. 16, 2009

(54) CROSSED ROLLER BEARING

(75) Inventors: Kazumasa Kunimoto, Mino (JP);
Naoki Koshino, Mino (JP)

(73) Assignee: Nippon Thompson Co., Ltd.,
Minato-Ku, Tokyo (JP)

( * ) Notice: Subject to any disclaimer, the term of this patent is extended or adjusted under 35 U.S.C. 154(b) by 307 days.

(21) Appl. No.: 11/534,037

(22) Filed: Sep. 21, 2006

(65) Prior Publication Data

US 2007/0076997 A1      Apr. 5, 2007

(30) Foreign Application Priority Data

Sep. 30, 2005    (JP) ............................... 2005-286698

(51) Int. Cl.
*F16C 19/30* (2006.01)

(52) U.S. Cl. .................. 384/447; 384/508; 384/559

(58) Field of Classification Search ............... 384/447, 384/507, 508, 559, 569, 618, 620; 16/20, 16/21, 46

See application file for complete search history.

(56) References Cited

U.S. PATENT DOCUMENTS

| | | | | |
|---|---|---|---|---|
| 328,176 | A | * | 10/1885 | Bailey .......................... 384/508 |
| 1,604,729 | A | * | 10/1926 | Weigel ............................ 16/21 |
| 3,275,391 | A | * | 9/1966 | Blais ............................ 384/447 |
| 3,768,840 | A | * | 10/1973 | Upton et al. .................... 285/16 |
| 4,316,305 | A | * | 2/1982 | Seaford .......................... 16/21 |
| 4,606,654 | A | * | 8/1986 | Yatsu et al. ................... 384/447 |
| 4,961,653 | A | * | 10/1990 | Suzuki et al. ................ 384/447 |
| 5,026,177 | A | * | 6/1991 | Masuda ....................... 384/447 |
| 5,531,307 | A | * | 7/1996 | Fechter et al. .............. 192/56.4 |

FOREIGN PATENT DOCUMENTS

JP          9-60647         3/1997

* cited by examiner

*Primary Examiner*—Thomas R Hannon
(74) *Attorney, Agent, or Firm*—Cozen O'Connor

(57) ABSTRACT

The thickness of a crossed roller bearing is reduced and attachment of a lid member 17 to a loading hole 16 from which rollers 15 are loaded is facilitated. Raceway grooves 13, 14 are respectively formed in an inner ring 11 and an outer ring 12. The rollers are loaded from the loading hole formed in the outer ring, and interposed between the raceway grooves. The axes of the adjacent rollers lie at right angles to each other. The loading hole is covered by the lid member. A flange 22 is provided on an outer periphery of the outer ring, and has an outer end face 22*a* that is approximately flush with an end face of the outer ring and an inner end face 22*b* that is either in a position in alignment with or in an inner position across outer ends of the raceway grooves in an axial direction.

3 Claims, 6 Drawing Sheets

Fig. 5   *Prior Art*
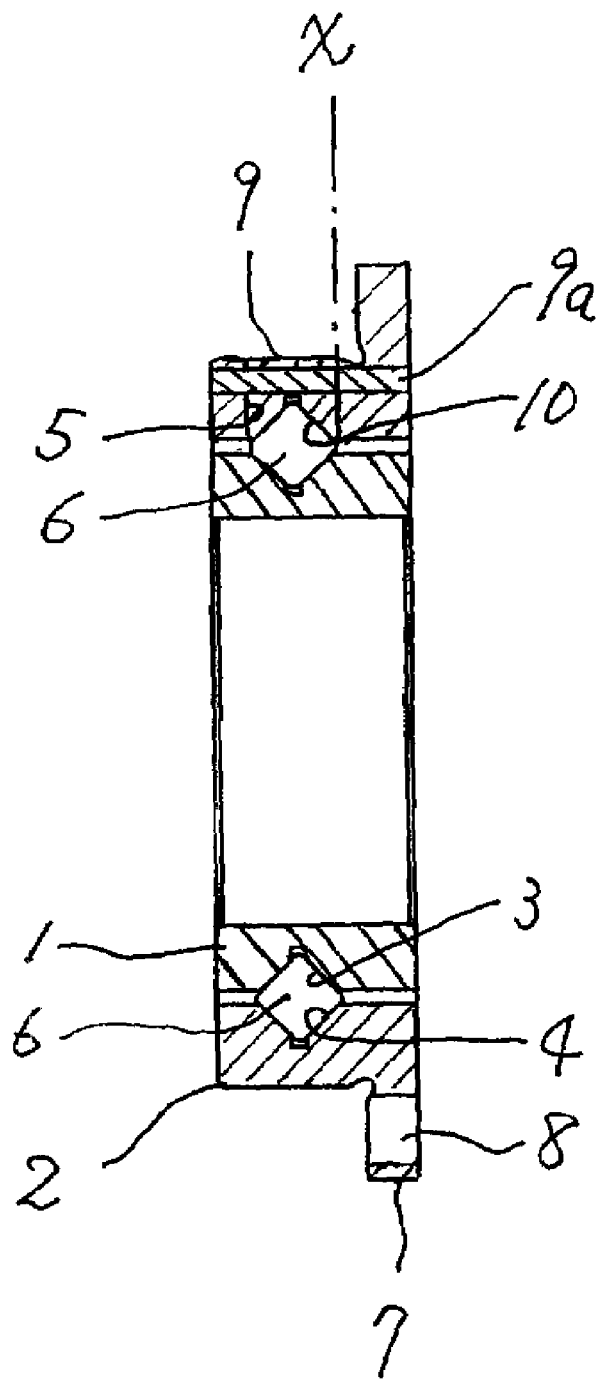

Fig. 6 *Prior Art*
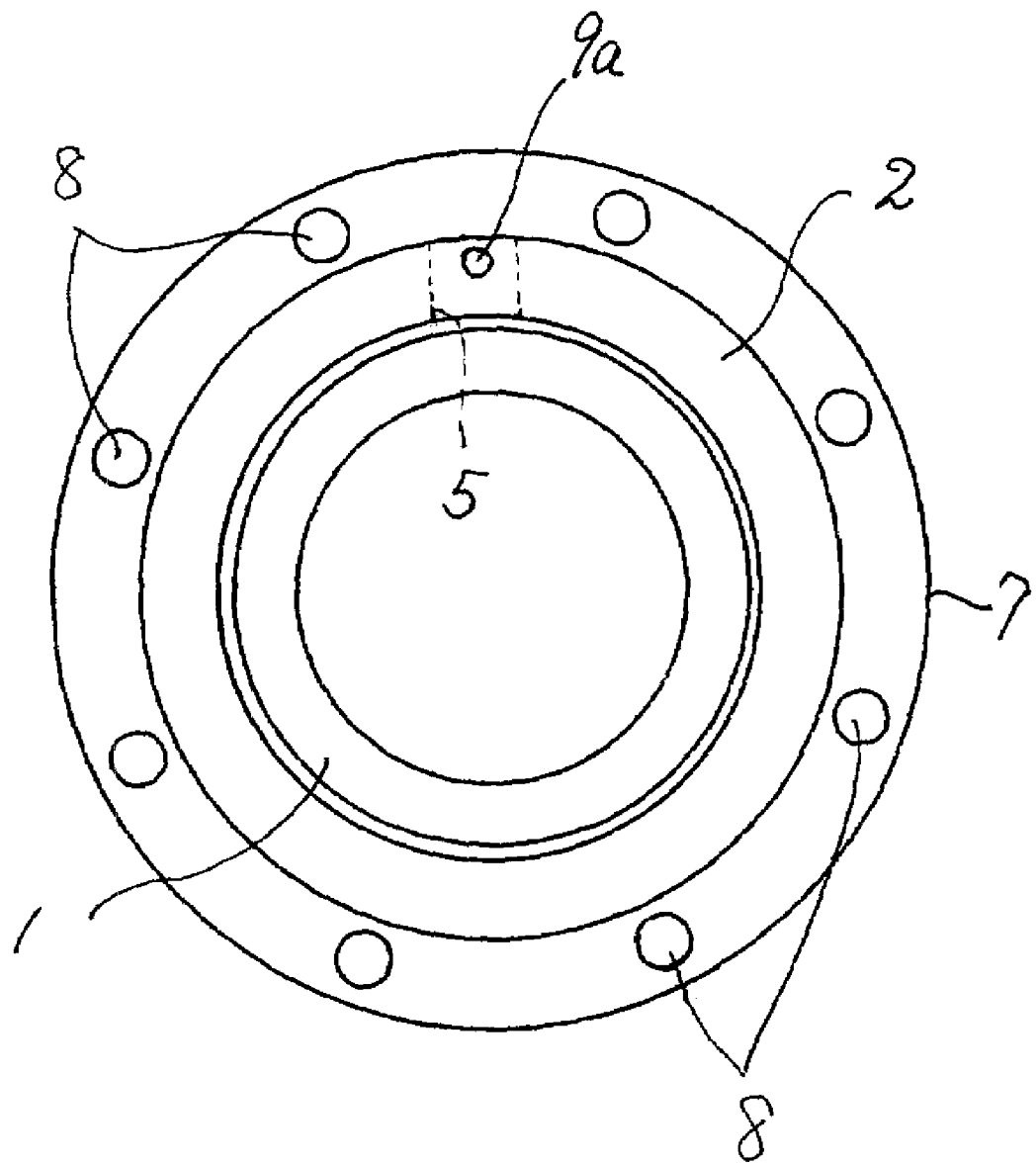

CROSSED ROLLER BEARING

BACKGROUND OF THE INVENTION

1. Field of the Invention

This invention relates to a crossed roller bearing having rollers interposed between an outer ring and an inner ring and a flange formed around the outer ring.

2. Description of the Related Art

For example, one of the conventional crossed roller bearings of the type described above is disclosed in JP-A-9-60647. For the conventional crossed roller bearing, an outer ring is cut into two ring parts, and then the two ring parts are joined with tie-bolts. The outer ring of the conventional bearing is divided into two parts in this manner for the purpose of arrangement of rollers between raceway grooves of the inner ring and the outer ring. For the arrangement of rollers between the raceway grooves, the inner ring is placed inside one of a pair of parts constituting the outer ring, then rollers are arranged between them, and then the other part is placed in such a manner as to put the top on the former part and is secured with tie-bolts.

Since the crossed roller bearing disclosed in JP-A-9-60647 as described above has the outer ring made up of two divided parts, the number of parts is disadvantageously increased. Further, since the two parts are joined with the tie-bolts, the number of man-hours is disadvantageously increased. When the two parts are joined with the tie-bolts, if a positioning error is caused in some degree, the rotation accuracy is reduced or the rotation torque is advantageously increased.

In order to solve the above problems, a crossed roller bearing having a one-piece type outer ring has been developed. This conventional crossed roller bearing is illustrated in FIGS. 5 and 6. The conventional crossed roller bearing has an outer ring 2 provided on the outer peripheral face of an inner ring 1. A raceway groove 3 is formed in the outer peripheral face of the inner ring 1 and a raceway groove 4 is formed in the inner peripheral face of the outer ring 2. A loading hole 5 is formed in the outer ring 2 for loading rollers 6 from the loading hole 5. The rollers 6 loaded from the loading hole 5 are arranged such that the axes of the adjacent rollers 6 are at right angles to each other. In order for the bearing to be capable of simultaneously receiving a moment load, a load in an axial direction and a load in a radial direction, the axes of the adjacent rollers 6 are arranged at right angles to each other.

A flange 7 is provided on the outer ring 2. As is seen from FIG. 6, the plane shape of the flange 7 is circular and mounting holes 8 are formed in the flange 7 at approximately regular intervals. Bolts (not shown) are fitted through the mounting holes 8 so as to secure the flange 7 to, for example, a housing (not shown).

As is clear from FIG. 5, the conventional bearing has a thickness in the axial direction resulting from addition of the thickness of the flange 7 to the thickness of the outer ring 2 in the axial direction. In other words, the flange 7 is positioned close to the outermost of the bearing and out of alignment with the position of the outer ends X of the raceway grooves 3 and 4 in the axial direction.

FIG. 5 shows a lid member 9 for covering the loading hole 5. A V-shaped groove 10 is formed in the lid member 9 and is connected to the raceway groove 4 of the outer ring 2 to form a part of the raceway groove 4. The lid member 9 covers the loading hole 5 after all the rollers 6 are incorporated from the loading hole 5 as described above. Then, a pin 9a is fitted into a pin hole formed in the lid member 9 so that the lid member 9 is secured to the outer ring 2.

The conventional crossed roller bearing structured as described above has a great thickness as whole in the axial direction because the thickness of the flange 7 is added to the thickness of the outer ring 2 in the axial direction. The great thickness causes a disadvantageous increase in size and weight of the bearing. In particular, when the bearing is used, for example, for a joint portion of an industrial robot performing a precision task, an increase in size and/or weight of the bearing not only leads to an increase in size of the industrial robot, but also interferes with the precise and quick operation.

SUMMARY OF THE INVENTION

It is an object of the present invention to provide a crossed roller bearing which is capable of being reduced in the entire thickness to be made compact and facilitating an assembling process.

The present invention provides a crossed roller bearing which has raceway grooves respectively formed in an inner ring and an outer ring, includes rollers loaded from a loading hole formed in the outer ring, and interposed between the raceway grooves, in which the axes of the adjacent rollers lie at right angles to each other, and has a lid member covering the loading hole. A feature of the present invention is a flange that is provided on an outer periphery of the outer ring and has an outer end face that is approximately flush with an end face of the outer ring and an inner end face that is either in a position in alignment with or in an inner position across outer ends of the raceway grooves in an axial direction thereof. The phrase "approximately flush with" used here means that even if the outer end face of the flange and the end face of the outer ring are not completely flush with each other, a somewhat error between them is permitted.

A first feature of the present invention is a relief recess that is formed in a flange face corresponding to the loading hole formed in the outer ring for attachment of the lid member to the loading hole.

A second feature of the present invention is that the flange has four sides forming a tetragon and four arc-shaped corners of the tetragon.

A third feature of the present invention is that the four corners of the flange have a plurality of mounting holes formed therein.

According to the first feature of the present invention, in the crossed roller bearing, the outer circular-shaped end face of the flange and the circular-shaped end face of the outer ring are approximately flush with each other and the inner end face of the flange is in an inner position across the outer circular-shaped end of the raceway groove in the axial direction with respect to the outer end face of the flange. Thus, the thickness of the flange is much the same as that of the conventional flange, and the thickness of the crossed roller bearing is reduced. In other words, while the strength of the flange, which is similar to that of the conventional flange, is retained, the entire thickness can be reduced, leading to a reduction in size and weight of the crossed roller bearing. By achieving the reduction in size and weight of the crossed roller bearing, if the crossed roller bearing is used for an industrial robot, it does not interfere with the precise and quick operation of the robot.

According to the second feature of the present invention, because the relief recess for attachment of the lid member to the loading hole is formed in the flange face corresponding to the loading hole formed in the outer ring, the process of attaching the lid member to the loading hole is facilitated. The reason for this is described. When the inner end face of the flange is in an inner position across the outer end of the raceway groove in the axial direction as described above, the inner end face causes interference with the loading hole. When the interference between the flange and the loading hole occurs, the lid member cannot easily be attached to the loading hole. However, in the present invention, the relief recess is formed in the flange, so that the lid member is successfully attached through the relief recess to the loading hole. In consequence, the second feature solves a new problem arising from the achievement of the crossed roller bearing by the first feature. Hence, if, in the first feature, another structure is used to achieve the function of facilitating the attachment of the lid member to the loading hole, the first feature is not limited to the second feature.

According to the third feature of the present invention, because the flange has the four sides forming a tetragon and the four arc-shaped corners of the tetragon, for example, if the four sides is positioned closer to the outer diameter of the outer ring, the weight of the flange can be reduced as compared with the use of a conventional circular-shaped flange. Also, an enhancement in material yield is achieved.

According to the fourth feature of the present invention, because a plurality of mounting holes is formed in the four corners of the flange, the crossed roller bearing can be reliably secured to a housing or the like by fitting bolts through the mounting holes. In other words, while the weight of the flange is reduced, the crossed roller bearing can be effectively secured to a housing or the like approximately as in the conventional case.

BRIEF DESCRIPTION OF THE DRAWINGS

FIG. 5 is a sectional view of a conventional crossed roller bearing.

FIG. 6 is a plan view of an outer ring of the conventional crossed roller bearing.

DETAILED DESCRIPTION OF THE PREFERRED EMBODIMENT

Figure 1:
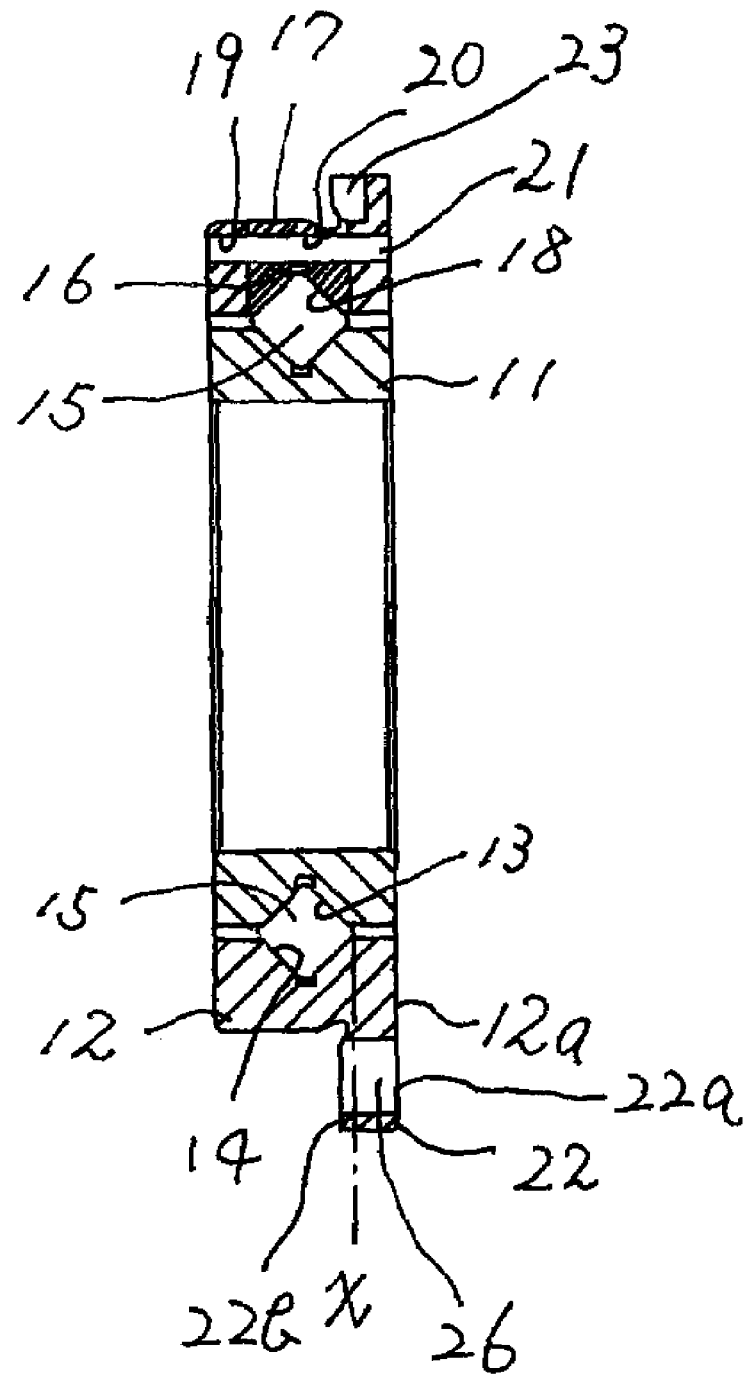
FIG. 1 is a sectional view illustrating a crossed roller bearing after assembly according to the present invention.
Figure 2:
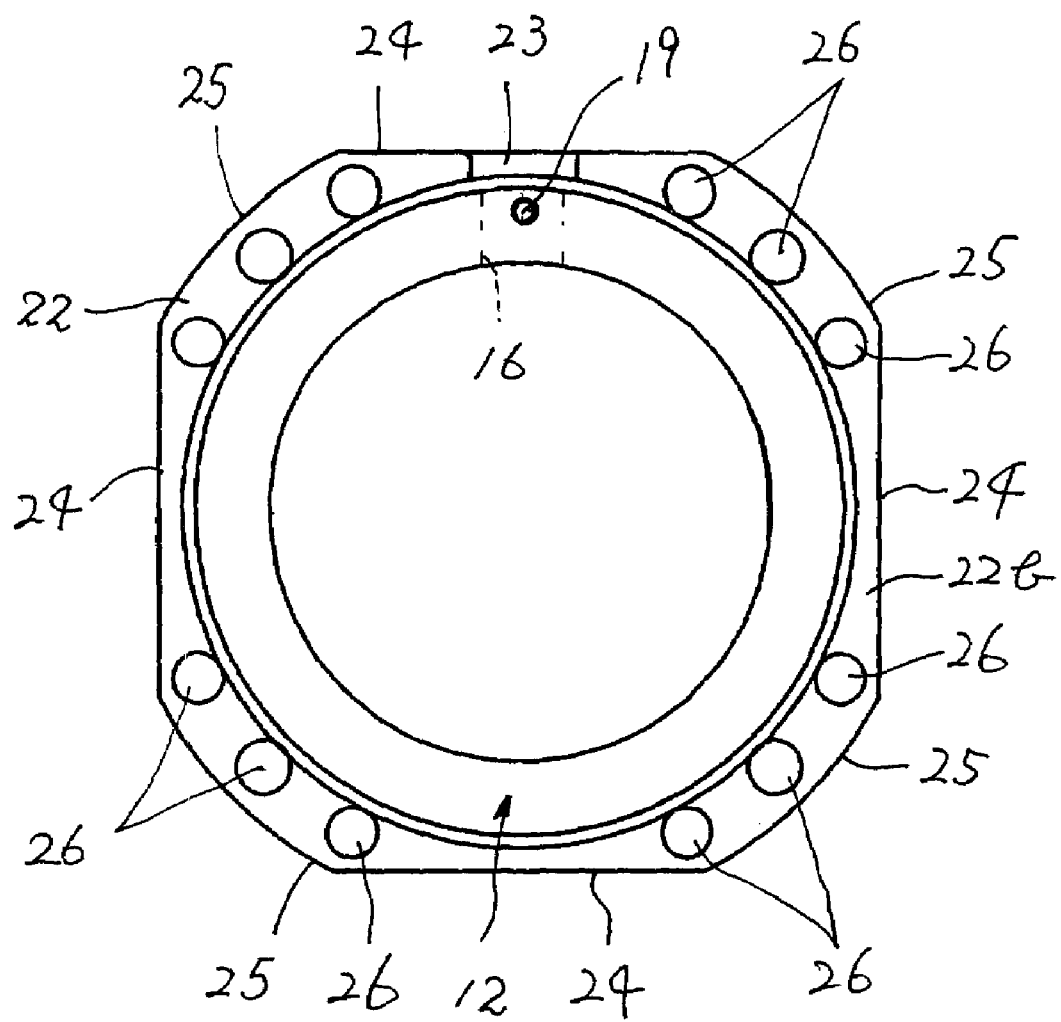
FIG. 2 is a plan view of an outer ring.
Figure 3:
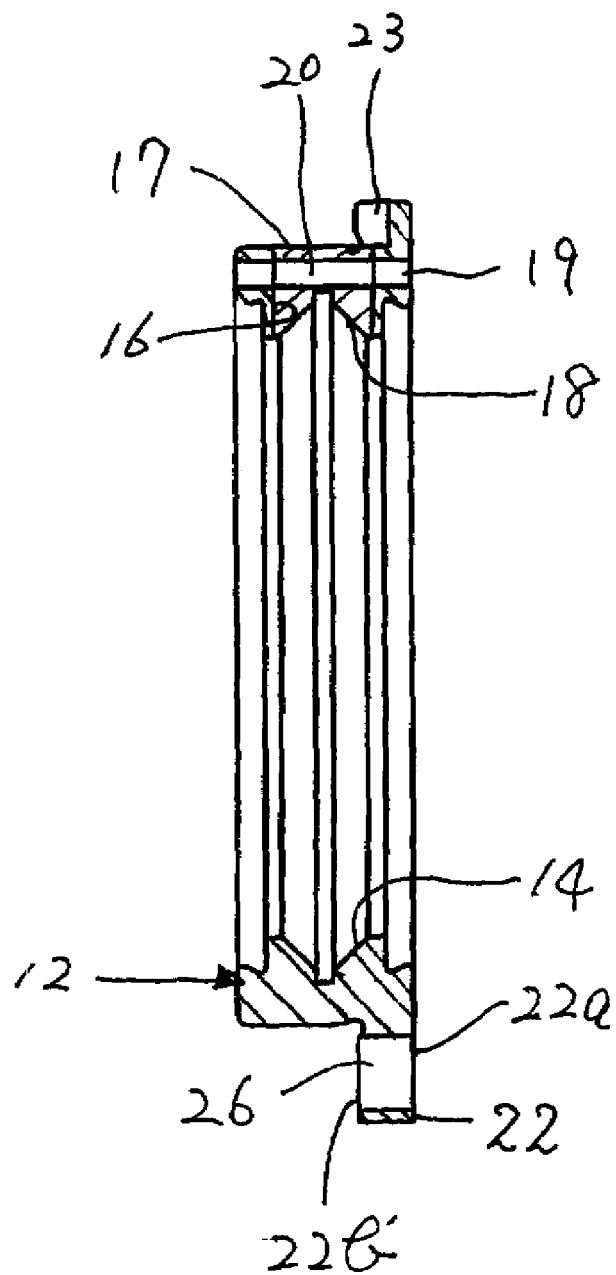
FIG. 3 is a sectional view of the outer ring with a lid member attached thereto.

FIGS. 1 to 4 illustrate an embodiment according to the present invention, in which an outer ring 12 is provided on the outside of an inner ring 11. Raceway grooves 13 and 14 are formed in the respective inner and outer rings 11 and 12. As is seen from FIGS. 1 to 3, each of the raceway grooves 13 and 14 has a V-shaped bottom face having a square corner. When the raceway grooves 13 and 14 face each other, rollers 15 each having a square sectional profile are arranged between the raceway grooves 13 and 13.

A loading hole 16 is formed in the outer ring 12 and extends from the outer periphery of the outer ring 12 to the raceway groove 14. The loading hole 16 is a round hole and has a diameter approximately equal to the length of a diagonal line of the square shape which is the sectional profile of each roller 15, so that each of the rollers 15 can be tilted and enter from the loading hole 16. The rollers 15 are inserted into between the raceway grooves 13 and 14 from the loading hole 16, in such a way that the rollers 15 adjacent to each other have the axes orthogonal to each other, whereby the crossed roller bearing can simultaneously receive a moment load, a load in an axial direction and a load in a radial direction as in the conventional case.

A required diameter of the loading hole 16 is more than the length of the diagonal line of the roller 15. However, the smallest possible diameter of the loading hole 16 is advantageous in order to ensure the rigidity of the crossed roller bearing. Form this viewpoint, instead of more than the length of the diagonal line of the roller 15 as in the embodiment, the diameter of the loading hole 16 may be set at a length between the diameter and the diagonal line of the roller 15. In the case of a smaller diameter of the loading hole 16 than the diameter used in the embodiment, each of the rollers 15 is inserted into the loading hole 16 after the axis of the roller 15 is kept parallel to the axis of the loading hole 16. Then, the roller 15 is tilted in the raceway grooves 13 and 14.

The loading hole 16 is covered by a lid member 17 in which a V-shaped groove 18 is formed. The V-shaped groove 18 form a part of the raceway groove 14 of the outer ring 12. A pin hole 19 is formed in the outer ring 12 in parallel to the axis of the outer ring 12. In other words, the pin hole 19 is orthogonal to the axis direction of the loading hole 16. A pin hole 20 connecting to the pin hole 19 is also formed in the lid member 17. The lid member 17 attached to the loading hole 16 is secured thereto with a pin 21 fitted into the pin holes 19 and 20. When the lid member 17 is fixed by the pin 21, the V-shaped groove 18 of the lid member 17 is connected to the raceway groove 14 so as to form a part of the raceway groove 14 of the outer ring 12.

A flange 22 is formed on the outer periphery of the aforementioned outer ring 12. The flange 22 keeps the following relationship. An outer end face 22a of the flange 22 is flush with the end face 12a of the outer ring 12. An inner end face 22b of the flange 22 is in an inner position across the outermost X of the raceway groove 14 in the axial direction with respect to the outer end face 22a. This structure of the flange 22 makes it possible to retain the same thickness of the flange 22 as that of a conventional flange and to reduce the thickness of the crossed roller bearing in the axial direction.

However, to position the inner end face 22b of the flange 22 in alignment with the inside of the raceway groove 14 involves the interference of the inner end face 22b of the flange 22 with the loading hole 16. This is because the V-shaped groove 18 of the lid member 17 attached to the loading hole 16 forms a part of the raceway groove 14, so that a relative position of the lid member 17 is determined as the next logical step, which thus determines a relative position of the loading hole 16. In this relationship, the positioning of the inner end face 22b of the flange 22 in alignment with the inside of the raceway groove 14 means that the end face 22b is positioned in alignment with the inside of the loading hole 16. As a result, the interference between the loading hole 16 and the inner end face 22b of the flange 22 occurs.

Figure 4:
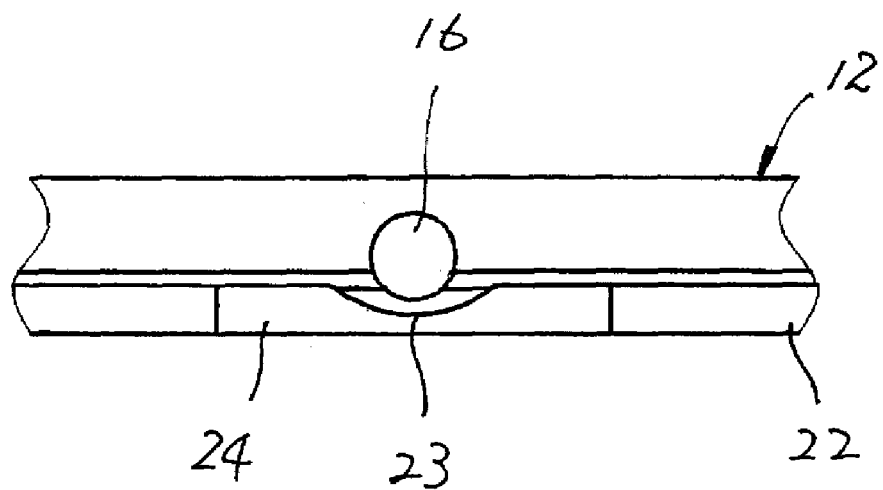
FIG. 4 is an enlarged view illustrating a relief recess.

The interference between the loading hole 16 and the inner end face 22b of the flange 22 makes it impossible to attach the lid member 17 to the loading hole 16. To avoid this, in the embodiment, as shown in FIG. 4, a relief recess 23 is formed in a flange face corresponding to the loading hole 16 formed in the outer ring 12. The formation of the relief recess 23 facilitates attachment of the lid member 17 to the loading hole 16, resulting in a smooth and simple assembling process.

The flange 22 has four sides 24 forming a tetragon and four arc-shaped corners 25 of the tetragon. A plurality of mounting holes 26 are formed in the four corners 25. As in the conventional case, bolts are fitted through the mounting holes 26 for fixing the crossed roller bearing to a housing or the like. In either case, if the flange 22 is shaped as described above, an enhancement in material yield and thus a reduction in size and weight are achieved, as compared with the conventional flange 7 of a circular shape, for example.

What is claimed is:

1. A crossed roller bearing, which has raceway grooves respectively formed in an inner ring and an outer ring, includes rollers loaded from a loading hole formed in the outer ring, and interposed between the raceway grooves, in which the axes of the adjacent rollers lie at right angles to each other, and has a lid member covering the loading hole, comprising a flange provided on an outer periphery of the outer ring and formed integrally with the outer ring, the flange having (1) an outer end face being a first opposing end face of the flange in the axis direction and is approximately flush with one of the opposing end faces of the outer ring in its axis direction and (2) an inner end face being a second opposing end face of the flange in the axis direction and is either in a position in alignment with flange side outer ends of the outer ends of the raceway grooves in their axis direction or in a position located closer to the axis direction center of the crossed roller bearing than the position in alignment with the flange-side outer ends; and a relief recess formed in the end face of the flange corresponding to the loading hole formed in the outer ring for attachment of the lid member to the loading hole.

2. A crossed roller bearing according to claim 1, wherein the flange has four sides forming a tetragon and four arc-shaped corners of the tetragon.

3. A crossed roller bearing according to claim 2, wherein the four corners of the flange have a plurality of mounting holes formed therein.

* * * * *